US012396580B2

(12) United States Patent
Sabulao

(10) Patent No.: US 12,396,580 B2
(45) Date of Patent: Aug. 26, 2025

(54) NECK SUPPORT

(71) Applicant: Rico Sabulao, Bedford Corners, NY (US)

(72) Inventor: Rico Sabulao, Bedford Corners, NY (US)

(*) Notice: Subject to any disclaimer, the term of this patent is extended or adjusted under 35 U.S.C. 154(b) by 0 days.

(21) Appl. No.: 16/233,630

(22) Filed: Dec. 27, 2018

(65) Prior Publication Data

US 2019/0239668 A1 Aug. 8, 2019

Related U.S. Application Data

(60) Provisional application No. 62/613,801, filed on Jan. 5, 2018.

(51) Int. Cl.

| | |
|---|---|
| ***A47G 9/10*** | (2006.01) |
| ***A47C 7/38*** | (2006.01) |
| ***A47C 20/00*** | (2006.01) |
| ***A61F 5/055*** | (2006.01) |
| *A61H 1/02* | (2006.01) |

(52) U.S. Cl.
CPC ............ *A47G 9/1081* (2013.01); *A47C 20/00* (2013.01); *A47G 9/1009* (2013.01); *A61H 1/0296* (2013.01); *A61H 2201/1609* (2013.01)

(58) Field of Classification Search
CPC ...... A47G 9/1081; A47G 9/1009; A47G 9/10; A47G 9/109; A47G 9/1072; A47G 2009/1018; A47G 9/08; A47G 9/90; A47C 20/00; A47C 7/36; A47C 16/00; A47C 7/383; A47C 7/38; A47C 20/027; A61H 2201/1609; A61H 1/0296; A61H 2205/04; A61H 2205/02; A61H 2201/0134; A61G 13/12; A61G 13/1205; A61G 13/121; A61G 13/1215; A61G 7/072; A61G 5/121; A61G 7/07; A61G 15/12; A61G 15/125; A61G 13/126; A61F 5/56; A61F 5/05883; A61F 5/05891; A61F 5/055; A61F 5/37; A61F 5/3707; A61B 6/0421; A61B 6/0428; A61B 6/0407; A61B 6/04; A41D 13/055; A41D 13/0512; A41D 13/0556; A41D 13/0562; A41D 13/0568
USPC ............ 602/18, 17; 128/845; 5/636; D6/601
See application file for complete search history.

(56) References Cited

U.S. PATENT DOCUMENTS 4,400,820 A * 8/1983 O'Dell ................. A61B 6/0421 128/845
4,494,261 A * 1/1985 Morrow ................. A47G 9/109 5/636
5,537,703 A * 7/1996 Launder ................. A47G 9/109 5/636

(Continued)

OTHER PUBLICATIONS

Guez, WO 2005/060797 A1, Jul. 7, 2005.*
Sheng, CN-2051065, Jan. 17, 1990.*

*Primary Examiner* — Camtu T Nguyen
(74) *Attorney, Agent, or Firm* — Jennifer L. O'Connell

(57) ABSTRACT

A neck support includes a frame enclosing an opening. The frame has an outer perimeter, a front side, an upper portion and a lower portion. The opening is configured to receive a user's head. The neck support further includes a notch in a lower portion of the frame, a strap connected to the frame and extending across the opening and a first support material on a part of the strap and frame covering the opening. The first support material, the notch and strap are for supporting a user's vertebrae and head.

20 Claims, 6 Drawing Sheets

(56) References Cited

U.S. PATENT DOCUMENTS

| | | | | | |
|---|---|---|---|---|---|
| 5,813,065 | A * | 9/1998 | Tinhorn | A47G 9/10 | 5/636 |
| 9,375,105 | B2 * | 6/2016 | Thomson | B60N 2/882 | |
| 9,861,510 | B2 * | 1/2018 | Sakamoto | A61F 5/055 | |
| 10,226,130 | B2 * | 3/2019 | Hill | B60N 2/882 | |
| 2006/0258968 | A1 * | 11/2006 | Slater, II | A61F 5/3707 | 602/32 |
| 2006/0290195 | A1 * | 12/2006 | Roleder | A47G 9/10 | 297/397 |
| 2013/0232695 | A1 * | 9/2013 | Koci | A47G 9/1081 | 5/640 |
| 2014/0026323 | A1 * | 1/2014 | Bowers | A47G 9/10 | 5/636 |
| 2015/0265075 | A1 * | 9/2015 | Liu | A61F 5/56 | 5/640 |
| 2016/0120725 | A1 * | 5/2016 | Slattery | A61G 13/0018 | 5/622 |
| 2022/0160152 | A1 * | 5/2022 | Mani | A47G 9/10 | |

* cited by examiner

NECK SUPPORT

CROSS REFERENCE TO RELATED APPLICATION

This claims the benefit of U.S. Provisional Patent Application No. 62/613,801 filed Jan. 5, 2018, the entire disclosure of which is hereby incorporated by reference herein.

The neck support relates to a device and treatment designed to relieve pain or discomfort in the neck and to increase range of motion in the cervical spine.

BACKGROUND

Many people suffer from issues relating to neck pain, headaches and tightness around the neck area. There is a need to find relief Physicians, physical therapists, chiropractors and engineers have studied the effects of decreased range of motion in spine and developed numerous devices to alleviate the problems that develop in muscles, ligaments, joints, nerves and tendons. Trauma induced or consistent poor posture can result in pain, tightness of soft tissues, restricted movement of the neck, headaches and cervical spine deformities.

Known devices on the market lead to extension of the neck, hyperextension of the neck or promote head forward flexion posture thereby increasing muscle tension in the end. These and other known devices do not result in desired body alignment, for example, ears do not line up with shoulders. The framework materials are too soft or rigid and optimum cervical positioning is not achieved.

"Boppy" and cervical pillow are known in the art. When using a boppy pillow, the neck is in an extended position. When using a cervical pillow, the neck is in a hyperextended position.

"Myofascial release blocks" are also known in the art. The myofascial release block is a very rigid support that forces the neck into hyperextension.

Other supports or pillows known in the art place the neck in flexion

SUMMARY OF THE INVENTION

An object of the present invention is a neck support for rehabilitation treatment. The neck support may be used for relief of neck pain, nerve impingement, muscle spasm and tightness that results in headaches, tension and limited range of motion, which affect functions such as driving, decreased visual field and any daily activities which involve turning the head, for example. The neck support which may be, for example, a "pillow-like" device can be used preferably on a flat surface of a bed or mat to achieve optimal positioning. The neck support may also be used when sitting in a lounge chair with a back and head support or in a standing position against a wall or similar support. The neck support device may be used initially for a period of 15 to 30 minutes and progressed to longer as tolerated.

A further object of this device is to support the cervical spine in correct alignment in order to relieve pain and relax soft tissues. The present invention reduces axial extension and decreases forward head posture thereby decreasing stress on the head and neck muscles. The cervical spine is placed in a stress-free position when using the neck support.

The present invention provides a neck support which decreases axial extension of the neck. The C1 and C2 vertebrae are placed in a neutral position. The neck support decreases tension or relaxes the neck muscles for example, the scalenes, SCM (stemocleidomastoid), occipitals, masseter, and other surrounding tissues by cradling the surrounding muscle in the back of head and neck. The neck support reduces or eliminates nerve impingement caused by tension or post trauma by placing the cervical spine in a stress-free environment. The neck support promotes a natural "chin tuck" stretch with little to no effort when lying in a supine position.

The present invention may provide the following advantages:

- optimum cervical positioning when lying supine without mechanical or electrical intervention;
- reducing or eliminating cervical derangement or impingement;
- cradling soft tissue and muscle at the back of the head down to the base of the skull and neck areas to relieve tension;
- achieving static traction with no energy expenditure or mechanical intervention;
- promoting a normal "chin tuck" position with a minimal amount of energy;
- increasing flexibility;
- relaxing muscles after using the neck support for a short period of time;
- reducing neck creases seen with aging.

BRIEF DESCRIPTION OF THE DRAWINGS

The present invention will be explained with reference to the following figures.

DETAILED DESCRIPTION

Figure 3:
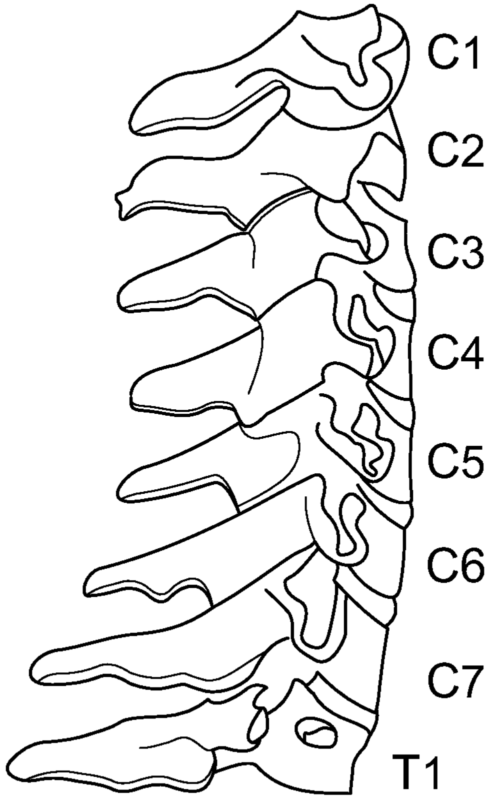
FIG. 3 shows vertebrae C1 to C7 of a human.

With regard to the human body, the neck or cervical spine is composed of 7 vertebrae, C1 to C7, discs, ligaments and muscle, see FIG. 3. The neck supports the head. The neck is very flexible and not protected by other structures, consequently the neck is more susceptible to stresses and strains than other parts of the spine. The neck has a natural curve, cervical lordosis, so the head is positioned directly above the shoulder. Due to poor posture the head is often positioned in front of the shoulders with the chin poking forward. Over time the natural curve is altered and neck problems develop such as joint pain, muscle spasms and limited range of motion.

Figure 1A:
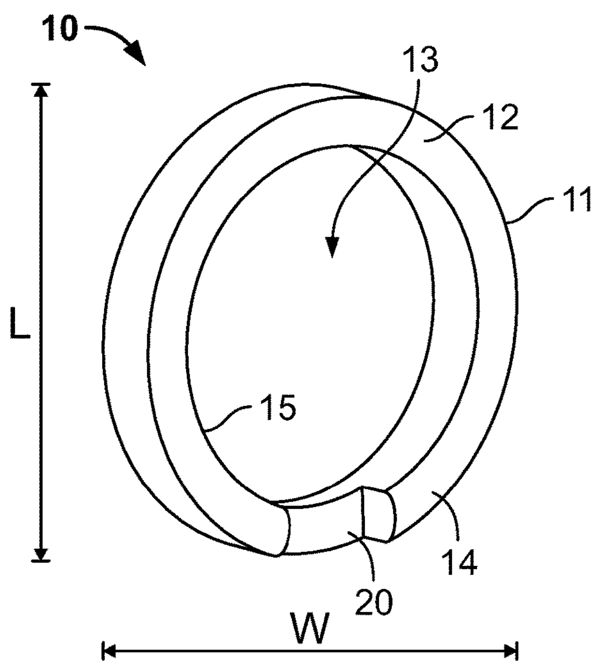
FIGS. 1*a* to 1*e* show the neck support of the present invention.
Figure 1B:
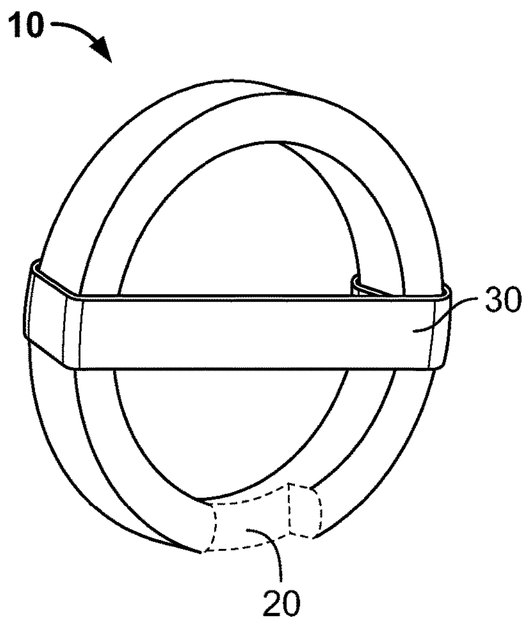
Figure 1C:
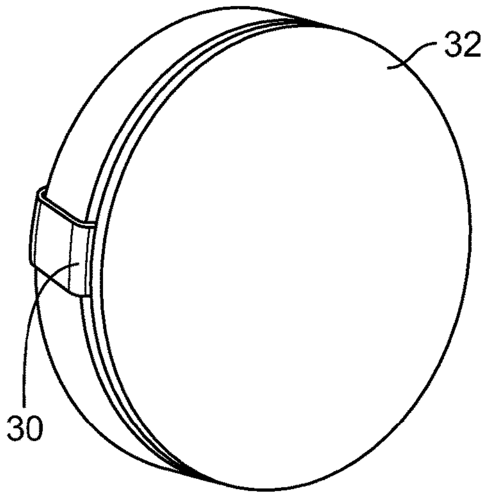
Figure 1D:
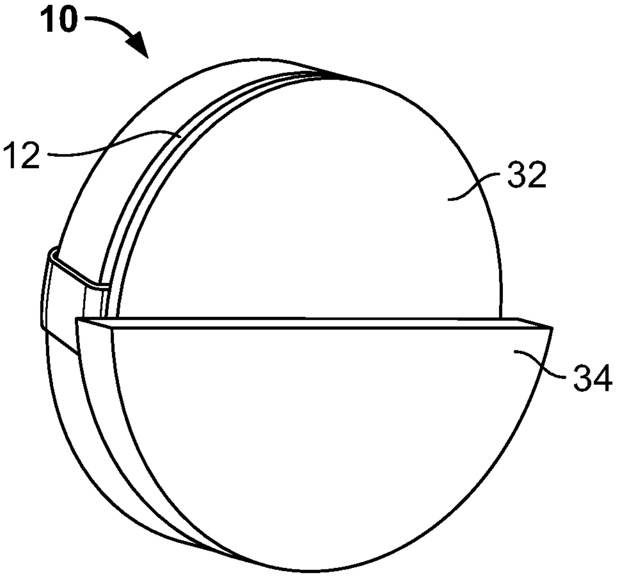
Figure 1E:
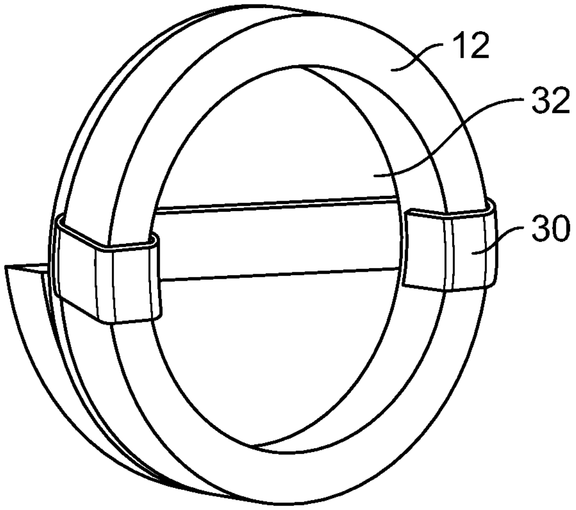

As shown in FIGS. 1*a* to 1*d*, the neck support 10 includes a frame 12 enclosing an opening 13 to accommodate the back of the head down to the cervical spine comfortably. Frame 12 includes an outer perimeter 11 and an inner perimeter 15. The frame 12, as shown is circular, however, the present invention is not limited to this design. Frame 12 may be, for example, circular, square, triangular, pentagonal, hexagonal, rectangular, octagonal, or any shape that will accommodate the neck and head. Frame 12 may include, for example, an 11-inch diameter, a height of 1.5 inches and a width of 1.5 inches, for example. As shown in FIGS. 1*a*, 1*b* and 1*e*, opening 13 extends through the front and back sides of frame 12. As further shown in FIG. 1*a*, inner perimeter 15 surrounds and encloses a perimeter of opening 13.

Frame 12 may have a diameter ranging from 8 to 14 inches. Frame 12 may be made from foam having different shapes and qualities. Frame 12 may be made from other materials as well, for example, frame 12 may be inflatable. A cross-sectional shape may be cylindrical, beveled, square or odd shaped foams, the foam may be open or closed cell type, the diameter may range from 0.5 to 2.5 inches and the foam may be medium to hard density. Neck support 10 may also be manufactured using silicon injection molding. A lower portion 14 of frame 12 includes a notch 20 in the front side of the frame 12 from, for example, 0.5 to 4.0 inches wide depending upon the thickness and design of the frame and foam, at the base of the frame to accommodate the lower area of the cervical spine. FIG. 1*b*. The cut-out notch can be 0.25 to 0.75 inches deep extending from the front side to the back side of the frame 12. The design for the cut-out notch can be oval, square, diamond, round, rectangular, U-shape, V-shape (weir notch) or other notch shape to accommodate the cervical spine. The notch 20 can be padded with a soft thin foam 32 as needed for comfort and additional support for a user's lower cervical area. FIGS. 1*c* and 1*d*. A portion of the cervical spine is supported by notch 20 of frame 12. Notch 20 helps provide proper alignment of the cervical spine with relation to the head and frame 12.

Figure 2A:
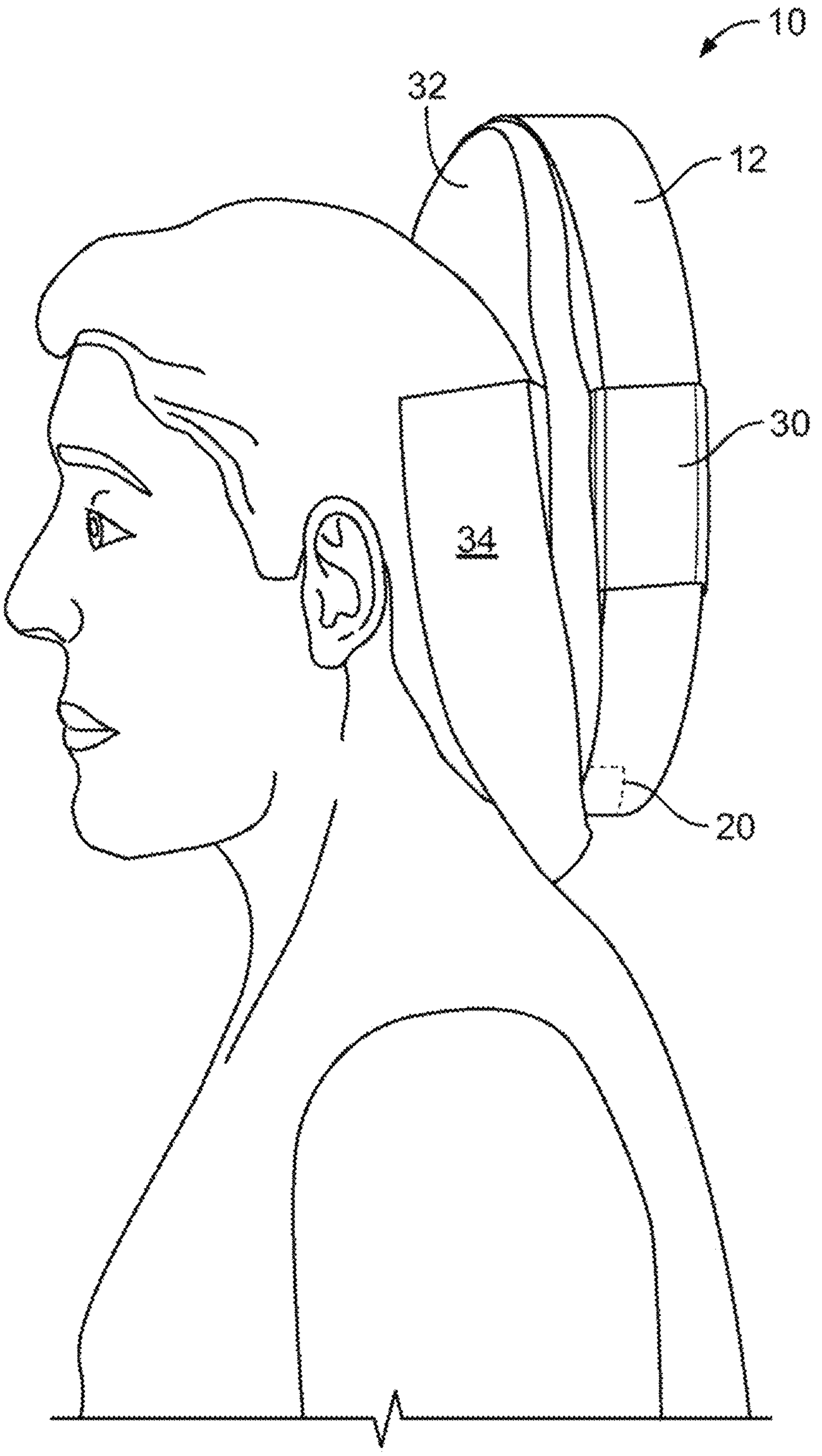
FIGS. 2*a* to 2*c* show the neck support supporting a user in a supine position, sitting position and standing position, respectively.

FIG. 1*e* shows a back side of the neck support 10. A strap 30 is connected across a front side of frame 12 to create a hammock, sling, webbing or shaping for the back of the head and neck. See FIG. 1*e*. The strap 30 is positioned slightly above a middle of frame 12 to accommodate the back of the head. The strap can be made out of hook and loop fastener, touch fastener, thin rubber, different fabrics, latex, foams and other materials that can be horizontally fastened across the side of the frame. Tension in strap 30 can be adjusted for comfort. Strap 30 also provides a base for support materials 32, 34. Ends of strap 30 may wrap around to a back side of frame 12. A user's head rests on the strap 30 in opening 13 via support materials 32, 34. As shown, in FIGS. 2*a* to 2*c*, a user's head may rest in the middle area of frame 12. For example, as shown in FIG. 2*a*, the user's head falls into opening 13 within the outer perimeter 11 of frame 12 and is supported by frame 12, strap 30 and support materials 32, 34.

A first support material 32, for example, made of thin foam from 0.25 to 1.0-inch-thick, or fabric, rubber, elastomers, vinyl or latex, may be placed on the front side of frame 12 over a center portion of strap 30 and opening 13. First support layer 32 may be 6 to 15 inches in diameter. See FIG. 1*e*. First support layer 32 may have the same outer perimeter dimension as frame 12 and cover frame 12 and opening 13. See FIG. 1*c*. As shown in FIGS. 1*c* and 1*e*, first support material 32 is arranged on the front side of frame 12, on top of opening 13 and inner perimeter 15. In FIGS. 1*c* and 1*e*, first support material 32 has the same perimeter as outer perimeter 11 of frame 12. Support material 32 is arranged on the front side of frame 12 so the outer perimeter of support material 32 aligns with outer perimeter 11.

A second support material 34, for example, which may be thicker than first support material 32, is placed over first support material 32 on the lower portion 14 of frame 12. The second support material 34 can be made out of regular foam, gel memory foam, regular memory foam, open or closed cell foam, fabric, egg crate foam, rubber or other material that gives comfort for resting the back of the head and neck. The second support material 34 may be 0.5 to 3.0 inches thick depending upon the type of foam and measuring 6 to 15 inches in diameter or width at the widest part depending upon size of user's head. The shape of this material may be half-moon/semi-circular (1*d*), circular, square, pentagon, triangle, hexagon, rectangle, octagon, or anything related to the shape that would accommodate the neck and back of the head. Fasteners, glue, epoxy or the like can be used to fasten the second support material 34 to lower portion 14 of frame 12 or first support material 32.

Figure 4:
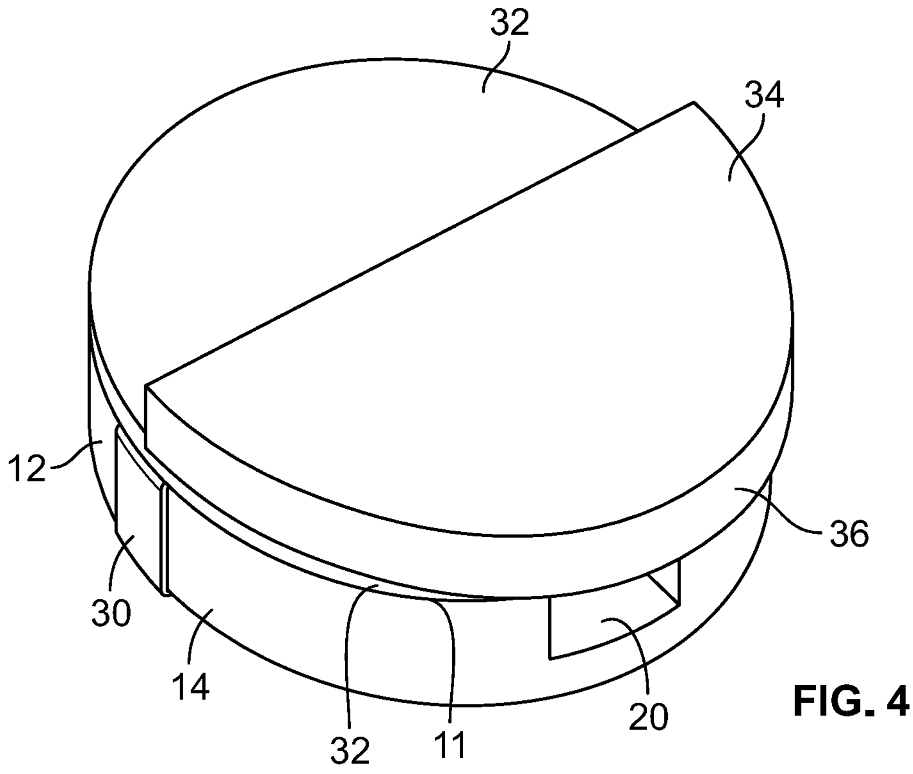
FIG. 4 is another view of the neck support of FIG. 1*d*.

An overhang portion 36 of support material 34 may extend beyond outer perimeter 11 in a lower portion 14 of frame 12. FIG. 4. An overhang of support material 32 may also be provided under overhang portion 36. Overhangs 36 provides additional support and comfort for a user's neck. Overhangs 36 may also be glued to notch 20.

A user aligns support 10 with their neck so the user can rest their cervical spine on notch 20. Vertebrae C1 to C6 are supported by the notch 20 and support materials 32, 34 thereon. The upper part of the cervical spine, for example, vertebrae C1-3, a base of the skull and a portion of the head are supported by strap 30, first support material 32 and second support material 34. Vertebrae C7 may not contact notch 20 or support 10 because vertebrae C7 may be just below frame 12. Though some users may find vertebrae C7 supported by notch 20 and materials 32, 34 or overhang 36, if present. The exact positioning of support 10 will depend upon on the user. By supporting vertebrae C1 to C6, notch 20 and support materials 32, 34 position the cervical spine in a neutral position.

The upper portion of the neck, ears and lower to mid part of the head are resting on strap 30 and first and second support materials 32, 34 which brings the user's head into a neutral position that provides proper chin tuck positioning. The chin tuck position moves the chin horizontally towards the spine thereby elongating the neck, the chin is tucking in to bring the ears back in alignment with the shoulders. Chin tuck encourages a gentle stretch of the neck muscles and provides better posture which in turn eases pain. A chin tuck position may be obtained in supine, sitting or standing positions. See FIGS. 2*a* to 2*c*.

The upper portion of the head is resting on first support material 32, thereby bringing the entire head into a comfortable position to ease tension of the cervical spine. When the weight of the neck and lower part of the head are resting on support 10, frame 12 elevates slightly against the user's neck and base of the head, thereby cradling or hugging the user's neck and head. In this position, the user may rest his neck and head on support 10 and use support 10 in the manner one would use a pillow.

Figure 2B:
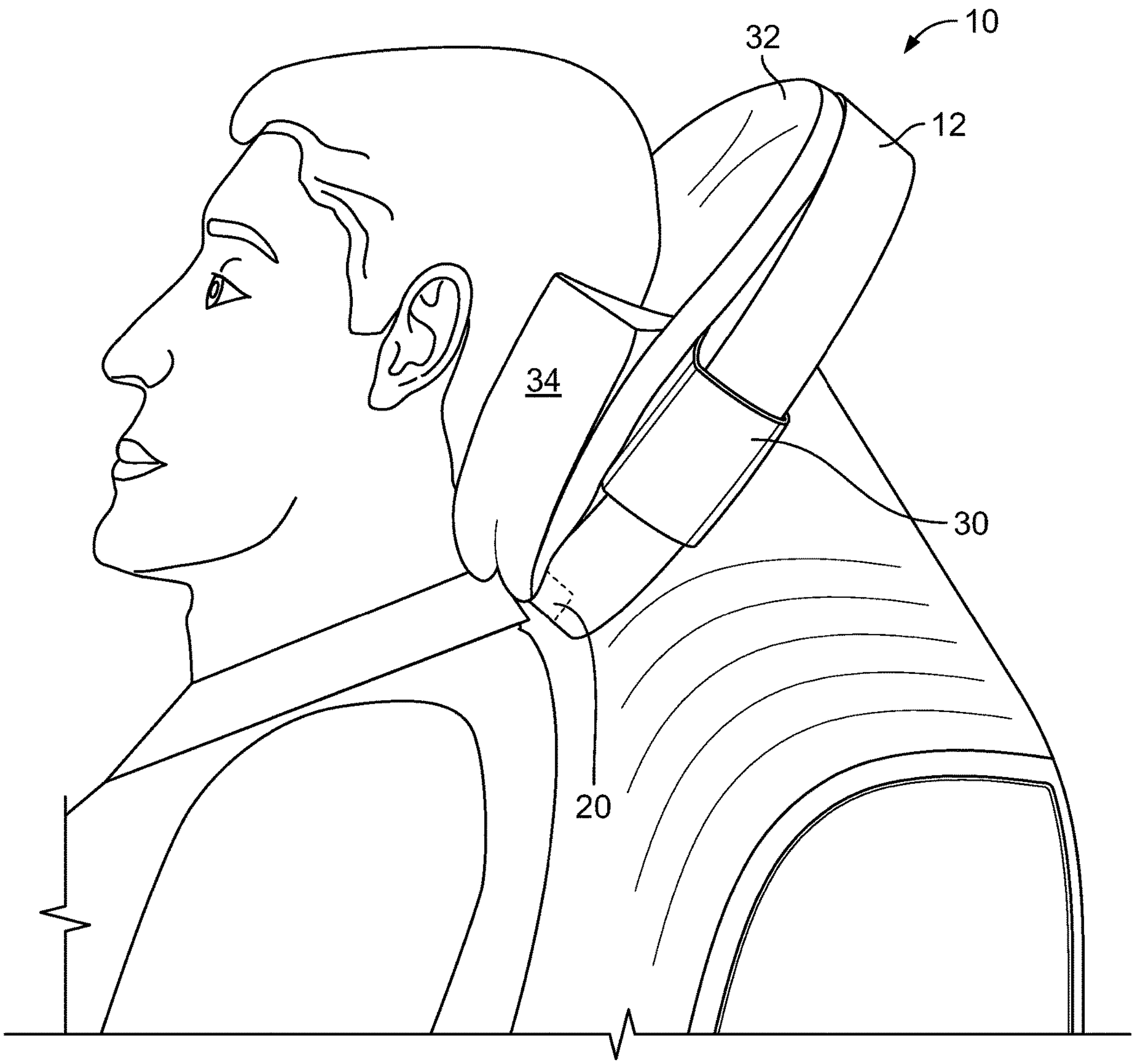
Figure 2C:
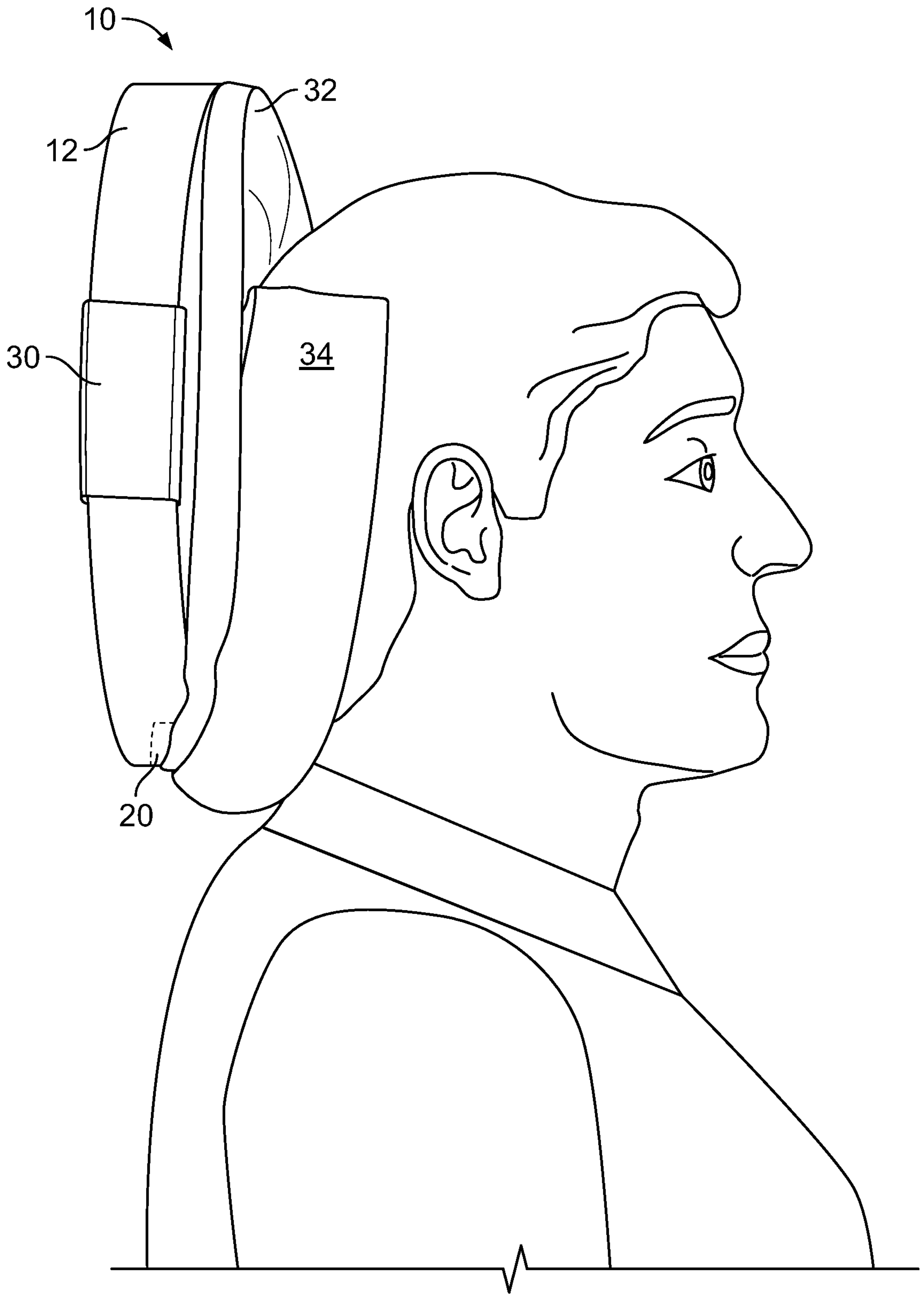

FIGS. 2*a*, 2*b* and 2*c* show a user using the neck support 10. In FIG. 2*a*, the user is laying down in a supine position, in FIG. 2*b*, the user is sitting and in FIG. 2*c* the user is standing. The neck of each user in each position is in a neutral position with the ears aligning with the shoulders.

Neck support 10 reduces axial extension and decreases a forward head posture thereby decreasing stress on the head and neck muscles. The cervical spine is placed in a stress-free position when using support 10. It promotes a normal "chin tuck" position with the least amount of energy, resulting in an increase of flexibility. Static traction is achieved with no energy expenditure or mechanical intervention. Neck support 10 relaxes the muscles after using support 10 for a short period of time. Neck support 10 may also work like an anti-aging device, reducing neck creases seen with aging.

FIGS. 2*a* to 2*c* show a user using support 10. Support 10 is placed under the user's head so the cervical spine vertebrae, C1-6, are resting on the notch 20, strap 30 and support materials 32, 34. Vertebrae C7 may not rest on notch 20. The upper spine, ears and lower portion of the head rest on second support material 34 so that neck and head are positioned in neutral. The remaining portion of the head rests on first support material 32 and strap 30.

In FIG. 2*a*, the user is in a supine position, lying flat on their back with strap 30 forming a hammock in opening 13. Support materials 32, 34, placed over strap 30, support a curved area of the neck to bring the neck into a neutral position. Frame 12 and support materials 32, 34 cradle the head to provide gentle traction and a neutral position.

In FIG. 2*b*, the user is sitting. Strap 30 and supports 32, 34 support the curved area of the neck to bring the neck into a neutral position. Frame 12 and support materials 32, 34 cradle the head to maintain position.

In FIG. 2*c*, the user is standing. Neck support 10 is firm against a surface or wall. Again, strap 30 and support materials 32, 34 support a curved area of the neck to bring the neck into a neutral position. Frame 12 and support materials 32, 34 cradle the head to maintain position.

FIG. 4 is another view of neck support 10. A strap 30 stretches across a width of frame 12. First support material 32 is applied across strap 30, opening 13 (FIG. 1*a*) and outer perimeter 11 of frame 12. Second support material 34 is placed on top of first support material 32 and strap 30 at lower portion 14 of frame 12.

Users can situate themselves on the device by holding a top of support 10 with one or two hands with the notch 20 positioned below the cervical spine. Users then apply a gentle upward pull motion to provide traction to the neck thereby aligning vertebrae C1 to C6 on notch 20.

Alternatively, users may place each thumb on an underside of lower portion 14 of support 10 and use the rest of the fingers to hold a middle of support 10. Users position the notch 20 below the cervical spine. Support 10 is then gently pushed in an upward motion to provide manual traction to the neck thereby aligning vertebrae C1 to C6 on notch 20. The user's head remains in contact with support 10 while traction is applied.

Users can apply more traction as needed to provide a comfortable feel to the neck.

When manual traction is applied, notch 20 is able to support the head and neck. The traction opens up the joint spaces in the cervical spine and places the affected muscles, ligaments, nerves and tendons in a stress-free environment.

Frame 12 and first and second support materials 32, 34 cradle the head and neck once the weight of the head is resting on the support 10. The weight of the head naturally lifts the sides of the frame 12 to cradle the head and neck as the head rests in the hammock created by strap 30 in opening 13, this support decreases tension in neck muscles.

With a 15-minute treatment time there should be pain relief and relaxation in neck and head.

The neck support may further comprise a custom case made of a soft washable fabric.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A neck support comprising:
- a ring-shaped frame enclosing an opening, the ring-shaped frame having a front surface, a back surface, a medial surface and a lateral surface, a depth of the ring-shaped frame extending from the front surface to the back surface, the medial surface defining a perimeter of the opening, the opening having a width, the opening being configured to receive a user's head;
- a notch formed in the ring-shaped frame, the notch being in the front surface, the medial surface and the lateral surface, a depth of the notch being less than the depth of the ring-shaped frame;
- a strap connected to the ring-shaped frame and extending across the width of the opening, and
- a first support material being placed on the strap and extending across the front surface,
- the first support material and the strap are configured to support the user's head.

2. The neck support recited in claim 1, further comprising a second support material placed over the first support material.

3. The neck support recited in claim 2, wherein the depth of the notch is from 0.25 to 0.75 inches.

4. The neck support recited in claim 2, wherein the second support material is thicker than the first support material.

5. The neck support recited in claim 2, wherein the second support material extends beyond the ring-shaped frame.

6. The neck support recited in claim 1, wherein the first support material is configured to receive a posterior side of the user's head.

7. The neck support recited in claim 6, wherein the strap contacts the front surface of the ring-shaped frame.

8. The neck support recited in claim 7, wherein the strap is fixed to the front surface of the ring-shaped frame.

9. The neck support recited in claim 6, wherein the strap is adjustable.

10. The neck support recited in claim 6, wherein a diameter of the ring-shaped frame is 8 to 14 inches.

11. The neck support recited in claim 1, wherein the opening extends through the front surface and the back surface.

12. The neck support recited in claim 1, further comprising a case for containing the neck support for use or storage, the case being made of a washable fabric.

13. The neck support recited in claim 1, wherein the first support material further extends across the notch.

14. The neck support recited in claim 1, wherein the medial surface and the lateral surface are concentric with each other.

15. The neck support recited in claim 1, wherein the medial surface extends from an edge of the front surface to an edge of the back surface.

16. The neck support recited in claim 1, wherein the first support material further extends across an entire area of the front surface.

17. The neck support recited in claim 1, wherein the ring-shaped frame is rectangular, circular or oval.

18. The neck support recited in claim 1, wherein the ring-shaped frame is made from a foam, inflatable or molded.

19. A neck support comprising:
- a ring-shaped frame enclosing an opening, the ring-shaped frame having a front side, a back side, a depth extending from the front side to the back side, a medial side and a lateral side, the ring-shaped frame being from 8 to 14 inches wide;
- a notch formed in the front side, the medial side and the lateral side, the notch being from 0.5 to 4.0 inches wide, a depth of the notch being less than the depth;
- a strap connected to the ring-shaped frame and extending across a width of the opening; and a first support material being placed on the strap and extending across the front side, the first support material being from 6 to 15 inches wide, the first support material and the strap are configured to support the user's head.

20. The neck support recited in claim 19, further comprising a second support material placed over the first support material.

* * * * *